(12) United States Patent
Cheng (10) Patent No.: US 7,146,455 B2
(45) Date of Patent: Dec. 5, 2006

(54) SYSTEM AND METHOD FOR OPTIMIZED ACCESS TO MEMORY DEVICES REQUIRING BLOCK WRITING

(75) Inventor: Chi-Chih Cheng, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 381 days.

(21) Appl. No.: 10/440,688

(22) Filed: May 19, 2003

(65) Prior Publication Data
US 2004/0236897 A1 Nov. 25, 2004

(51) Int. Cl.
*G06F 13/00* (2006.01)
(52) U.S. Cl. .................. 711/103; 711/165; 711/171
(58) Field of Classification Search ............. 711/103, 711/165, 171
See application file for complete search history.

(56) References Cited

U.S. PATENT DOCUMENTS 6,076,151 A * 6/2000 Meier ..................... 711/171
6,105,024 A * 8/2000 Graefe et al. ............. 707/7
6,115,799 A * 9/2000 Ogawa ..................... 711/171

* cited by examiner

Primary Examiner—Reba I. Elmore
(74) Attorney, Agent, or Firm—Thomas, Kayden, Horstemeyer & Risley (57) ABSTRACT

A method of optimized access of information in the memory subsystem of a computer system that requires the writing of information in blocks of continuous memory space is disclosed. The inventive method of information storage for storing a file in a memory device requiring block writing comprising the steps of first comparing the size of the file with each free block of the memory device for selecting a best-fit block therefrom. A fitted segment of the file corresponding to the best-fit block is then stored into the best-fit block. The comparing step and the storing step are then repeated if a remainder of the file remains after the storing until the entirety of the file has been stored in the memory device. An information storage system is also disclosed to comprise a memory device requiring block writing and a file system. The file system is built on top of the software driver module of the memory device and provides a memory block assignment algorithm for implementing an efficient information storage usage for storing a file in the memory device.

9 Claims, 9 Drawing Sheets

SYSTEM AND METHOD FOR OPTIMIZED ACCESS TO MEMORY DEVICES REQUIRING BLOCK WRITING

BACKGROUND OF THE INVENTION

A. Field of the Invention

This invention relates in general to a software system for memory devices and, in particular, to an optimized access software system for accessing memory devices requiring block writing.

B. Description of the Related Art

Information storage in computer systems involves the use of memory devices of various types. In general, information in relation to the operation of a computer system includes data and code stored in computer memory in the form of computer files, which are put away in the non-volatile memory of the computer either temporarily or permanently. This memory subsystem of a computer for file storage is sometimes referred to as the secondary memory.

On the other hand, there are also information directly related to the on-going computing activities of a computer that also include both code and data stored in the main system memory, sometimes referred to as scratch pad memory. Working program codes and some of the data for a computing task are retrieved from the secondary memory in the form of files. Data for the task is then worked on and may be stored back to the secondary memory temporarily during the task or permanently when the task concludes.

In a typical microprocessor-based personal computer system, high-speed semiconductor memory devices including SRAM (Static Random Access Memory) and DRAM (Dynamic Random Access Memory) are used as the main, or primary, memory. For computer files, large-capacity yet relatively slower hard disk drives are normally used. There are of course the use of non-volatile EEPROM (electrically erasable-programmable read-only memory) devices known as Flash memory for the storage of certain code and data in the mass-production PC, but the content in this memory is seldom changed. For example, BIOS (Basic Input/Output System) codes stored in Flash memory are only changed when upgraded.

By contrast, for many other mass-production and cost-sensitive computer systems such as multimedia/entertainment set-top boxes, Internet appliances (IA) of various kinds and communication equipments etc., the use of information storage devices is somewhat more mixed. Depending on design, a computer system may employ Flash memory for the storage of permanent computer files instead of HDD (Hard Disk Drive) while another may use sections of its Flash memory as scratch pad memory.

Regardless of what information goes into what memory device in a computer system, a management software system is brought up on line once the computer boots up to manage all these information access activities, including the storage and retrieval of information into and out of these memory devices. In a general-purpose computer system such as a PC, main-stream operating systems of various flavor can be used, and in a dedicated computer device such as a network router or switch, either a minimum Linux from the public domain or some proprietary operating system is applicable.

Flash memory devices are becoming more used in computer systems for various storage requirements mentioned above. They can be used as emulated disk drives to replace HDD in harsh operating environments such as industrial and military. They can also be used in commercial applications including the storage of images taken by digital camera or the holding of personal information in devices such as USB (Universal Serial Bus) thumb-drives. Many dedicated-application embedded systems also use all-Flash emulated disk subsystems similar as in industrial and military since the total amount of Flash memory space required is relatively small in these applications. With a small Flash-based file storage subsystem in these embedded systems, the cost isn't necessarily higher, and other factors including reliability and compactness further justify the costs.

No matter what application a Flash memory device is used, it is subject to at least two limitations. First, cost factors have led to the requirement that write accesses in a Flash memory device be performed in blocks, not single memory locations. In other words, a typical mass-production Flash memory writes data into its memory cells in blocks of continuous memory locations even if only the writing of one address is intended. Without a housekeeping operation such as defragmenting reorganization of the entire memory content, holes of memory spaces rendered useless are left in the memory device. The direct result of this block-use is much reduced utilization efficiency of the entire memory space.

Second, memory cells in a Flash device have life cycle limitation of a few hundred write accesses. Conventional block writing schemes typically employed by computer systems installed with Flash memories tend to access some memory cells repeatedly while leaving others for rare access. This leads to a service life shorter than expected.

SUMMARY OF THE INVENTION

It is therefore an object of the present invention to provide a system and its corresponding method for optimized access to memory devices requiring block writing for improved memory space utilization efficiency.

It is another object of the present invention to provide a system and its corresponding method for optimized access to memory devices requiring block writing for averaged utilization of memory spaces for extended device service life.

It is yet another object of the present invention to provide system and its corresponding method for optimized access to memory devices requiring block writing for improved file portability in a computer system for reduced software development efforts and costs.

The present invention achieves the above and other objects by providing a method of information storage for storing a file in a memory device requiring block writing that comprises the steps of first comparing the size of the file with each free block of the memory device for selecting a best-fit block therefrom; then storing a fitted segment of the file corresponding to the best-fit block into the best-fit block; and repeating the comparing step and the storing step if a remainder of the file remains after the storing until the entirety of the file has been stored in the memory device.

The present invention also provides an information storage system that comprises a memory device requiring block writing and a file system built on top of the software driver module of the memory device. The file system provides a memory block assignment algorithm for implementing an efficient information storage usage for storing a file in the memory device. The file system comprises a storage layer and a file layer, and the storage layer further comprises a plurality of data blocks each corresponding to a memory block of the memory device. The storage layer maintains a record of the starting and ending addresses and the size of each of the corresponding memory blocks, and the file layer maintains a list of the selected data blocks for each data segment of the file to be stored.

BRIEF DESCRIPTION OF THE DRAWINGS

These and other objects and advantages of the present invention will become apparent when considered in view of the following description and accompanying drawings in which.

DETAILED DESCRIPTION OF THE PREFERRED EMBODIMENT

The optimized access software system of the present invention is advantageous in performing memory access, writing in particular, to memory devices such as Flash memory that require block writing. Optimization in the memory subsystem of a computer system implementing the software system of the present invention can be achieved due to maximized utilization of memory spaces and balanced memory cell writing cycles.

Figure 1:
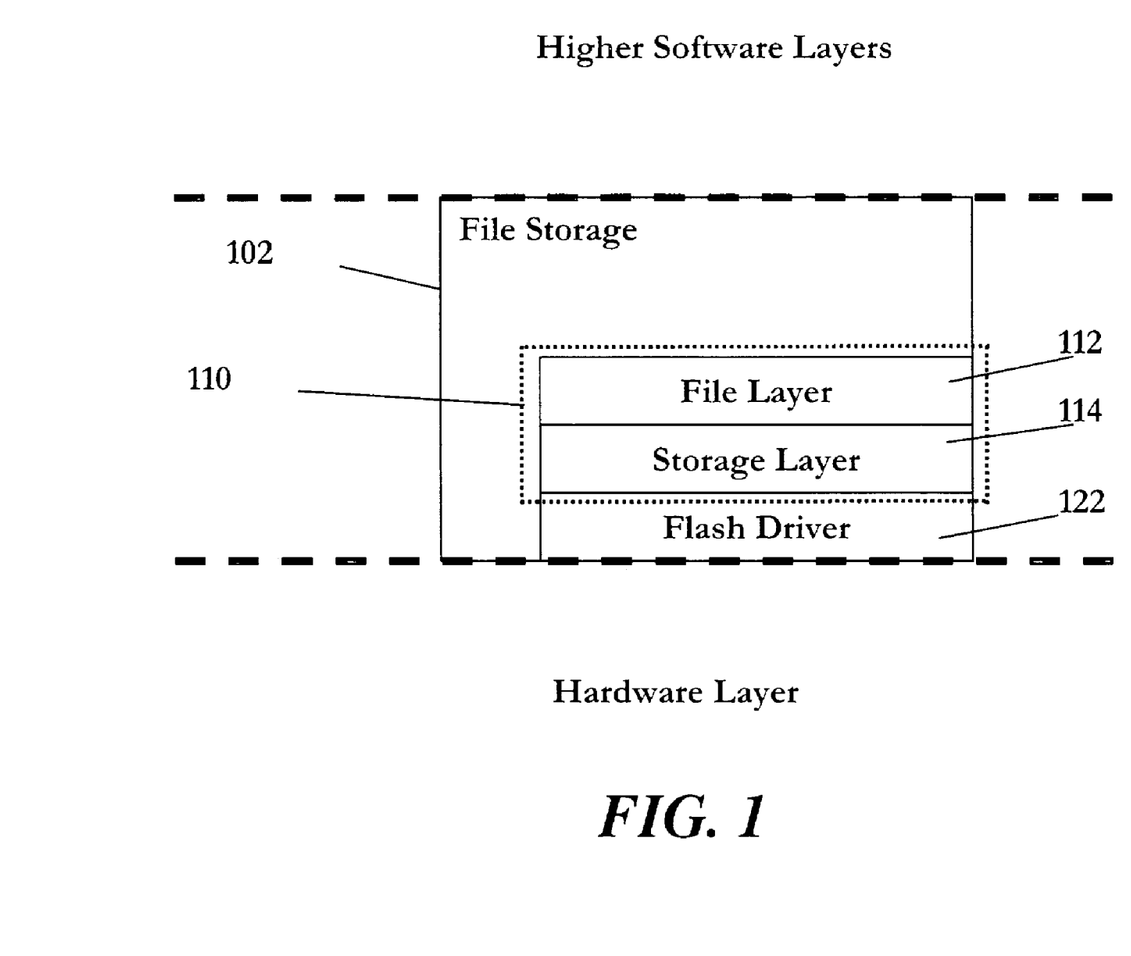
FIG. 1 is a block diagram outlining the structural layers of the optimized access software system in accordance with an embodiment of the present invention.

FIG. 1 is a block diagram outlining the structural layers of the inventive software system. In a preferred embodiment of the present invention, the optimized access software system generally represented by a phantom-lined block 110 comprises a file layer 112 and a storage layer 114, as is illustrated. In a typical computer system including a Flash memory hardware subsystem, the inventive software system 110 is preferably implemented on the hardware driver level, specifically on top of the driver software 122 responsible for physical access to the Flash memory devices in the subsystem. An inventive software system 110 on top of the basic Flash driver 122 thus constitutes a functional section of the file storage application software 102 in the host computer system.

Figure 2:
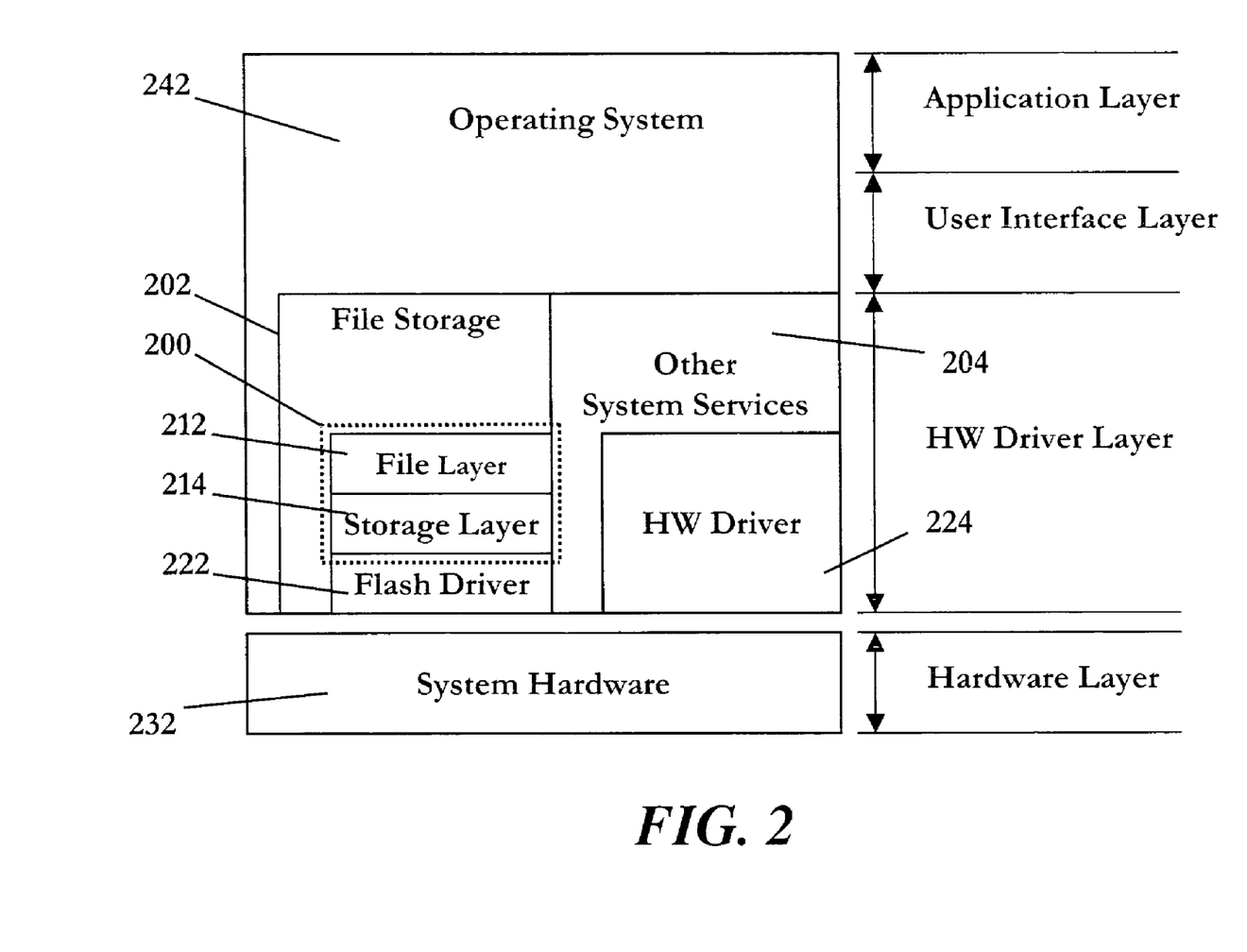
FIG. 2 is a block diagram illustrating the integration of the inventive software system of FIG. 1 in a typical operating system for a computer system.

FIG. 2 is a block diagram depicting the integration of the inventive optimized access software system 110 of FIG. 1 in a typical operating system for a computer. The computer system exemplified is represented generally by a hardware system 232, on which the operating system 242 can be initialized and the computer steered for the designed utilization goals once the system is powered on. Note that the type of such a computer system can be varied. In a general-purpose computer such as a PC, an operating system 242 is complete with a hardware driver layer including drivers generally represented in the drawing by HW driver 224 that is responsible for all low-level interfaces between the computer hardware and the operating system. This driver layer is responsible for providing system services such as the file storage 202 and others 204 for the operating system 242. On top of the hardware driver layer sits the user interface layer, usually a graphical interface for a general-purpose computer. Further up is the where the user launches all general-purpose application software such as word-processing and graphics manipulation.

By contrast, operating system 242 for some dedicated computer systems can be reduced-scale embedded operating systems such as different versions of the Linux OS or other, which are stripped down to the minimum and are sufficient only for the required functionality fulfilling the need of the dedicated-use host computer system. For cost reasons the hardware driver layer can be built on top of a minimum hardware to support the few application programs to be performed by the computer. User interface can also be minimum such as a command line interface, suitable for technical personnel's interface during development and maintenance sessions. For example, a network equipment such as a router or switch can be equipped with a communication-oriented hardware 232 running under a real-time operating system 242 with minimized kernel.

Regardless of what type a computer system is, file accesses are indispensable for the computer operation for which some involve write accesses into Flash-based memory devices. Compared to the magnetic disk drives used in commercial general-purpose computers, Flash memory may be providing the sole memory space for file storage by the operating system in embedded systems for dedicated consumer, industrial, military or other use. The optimized access software system outlined in FIGS. 1 and 2 above, in accordance with the teaching of the present invention, achieves a write-access scheme in Flash or other block-write memory devices of computer systems that is optimized for efficient use of memory space and ensures maximized device service life.

Figure 3:
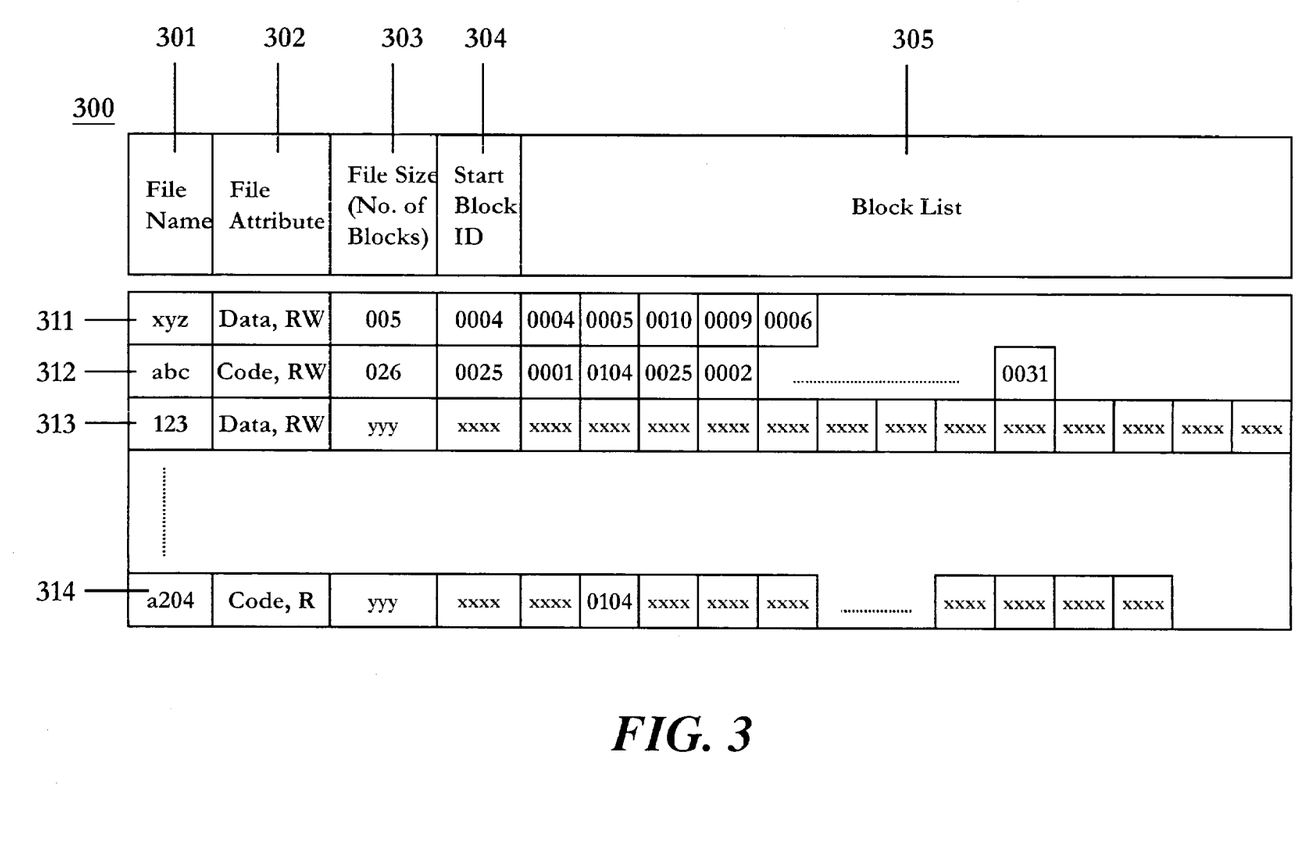
FIG. 3 outlines the file management implemented by the file and storage layers of the optimized access software system of the present invention.

In a preferred embodiment of the software system of the present invention, file layer (112 and 212 in FIGS. 1 and 2 respectively) is used to maintain a record of the block identification numbers and other related information of the files stored in the Flash memory subsystem of the host computer. On the other hand, the storage layer (114 and 214) keeps record of the starting block identification number and the size in total number of blocks used for each file stored in the Flash memory subsystem. FIG. 3 outlines, in a preferred embodiment, the file management implemented by the file and storage layers of the optimized access software system of the present invention.

As will be described in the following paragraphs, the storage layer can be considered to comprise a number of data blocks each corresponding to a memory block of the memory device. The storage layer maintains a record of the starting and ending addresses and the size of each of the corresponding memory blocks. The file layer, on the other hand, maintains a list of the selected data blocks for each data segment of the file sought to be stored.

As is illustrated in FIG. 3, management of file storage and retrieval as controlled by the file and storage layers of the inventive optimized access software system can be implemented via the maintenance of a file management table 300. The file management table 300 can be considered as an up-to-date listing of all necessary information for the control of file read/write accesses in the host computer system. The file management table 300 can be constructed anew each time the host computer system is started. In other words, the table 300 need not be saved permanently in the non-volatile memory of the computer when the computer is powered down.

The file management table 300 can, for example, be constructed by running a corresponding program routine during the boot up stage of the computer system. The routine can screen and parse through the content of the Flash memory subsystem and, according to pre-defined file structure to be described below, construct the table 300 to initiate the file management during the use of the computer system.

In a preferred embodiment, the table 300 comprises the following record fields for each entry of the files stored in the memory subsystem: a file name field 301, a file attribute field 302, a file size field 303, a starting block identification field 304, and a block list field 305.

Each of all the files stored in the memory subsystem of the host computer has an entry in this file management table 300. For example, in the depicted embodiment of FIG. 3, several files 311, 312, . . . and 314 are illustrated to have their particulars listed in the table 300, complete with all information fields 301, 302, . . . and 305.

In the file management table 300, file name field 301 is one piece of information used to identify the file, both for human and machine. File attribute 302 can be used to record particulars of the stored files useful for the control in their use in the host computer. For example, read/write attributes and the nature of a file regarding if it can be categorized as a data or a code file are all useful information for the operating system in its management of the computer tasks related to the very read/write access to the file.

On the other hand, the starting block ID (Identification) field 304 keeps track of the exact location of the very first memory block for a file stored in the memory subsystem. This allows for the host computer hardware to have a clue concerning where to start the access of a requested file. For example, in an attempt to read-access the file abc in the entry 312 of the file management table 300, the system can be directed to start its access process at memory block 0025 in the memory subsystem. A file access scheme to be described subsequently in the following paragraphs can then pick up athe other blocks for the accessed file.

The block list field 305 in the table 300 for each file entry is a list of all block IDs other than the first—starting—block for that file stored in the memory subsystem. For example, the file xyz as identified by entry 311 in the table 300 has a block list that lists the five blocks with block IDs 0004, 0005, 0010, 0009 and 0006.

Note that in the depicted example of FIG. 3, the starting block ID in field 304 for a file entry is also listed in the block list field 305. For example, the file xyz, entry 311, actually consists of five blocks, including the starting block 0004 recorded in the start block ID field 304. Also note that the order of block IDs listed in the field 305 may not be the same order as that for all blocks when they are correctly assembled into the file. For example, the second block in the file xyz next to the starting block 0004 may be block 0010 that comes in as the third place in the block list field 305 in the table. This is possible since repeated write accesses to the file may eventually scramble the order of block IDs in the listed string.

Another field, the file size field 303 keeps record of the total number of memory blocks used for the storage of each file. The file size field can be considered as a redundancy measure for ensuring the integrity of file management in the system. The file size in terms of the total number of memory blocks used can apparently be resolved by counting the number of block ID entries in the block list field 305. Such a counting may be employed as a means to double-check the integrity of file information in the file management table 300, particularly after repeated write-accesses to the file in the memory subsystem.

Each block ID entry in the block list field 305 for a file entry in the file management table 300 also includes registers for the start and end memory locations in the particular block of memory assigned for the particular use of the file. Since a file segment of a target file to be stored into the block-write memory subsystem may not be large enough to occupy the memory space of an entire block, particularly the tail segment of a file, it is therefore possible that a block of memory may be used for the storage of file segments of more than one file.

Figure 4:
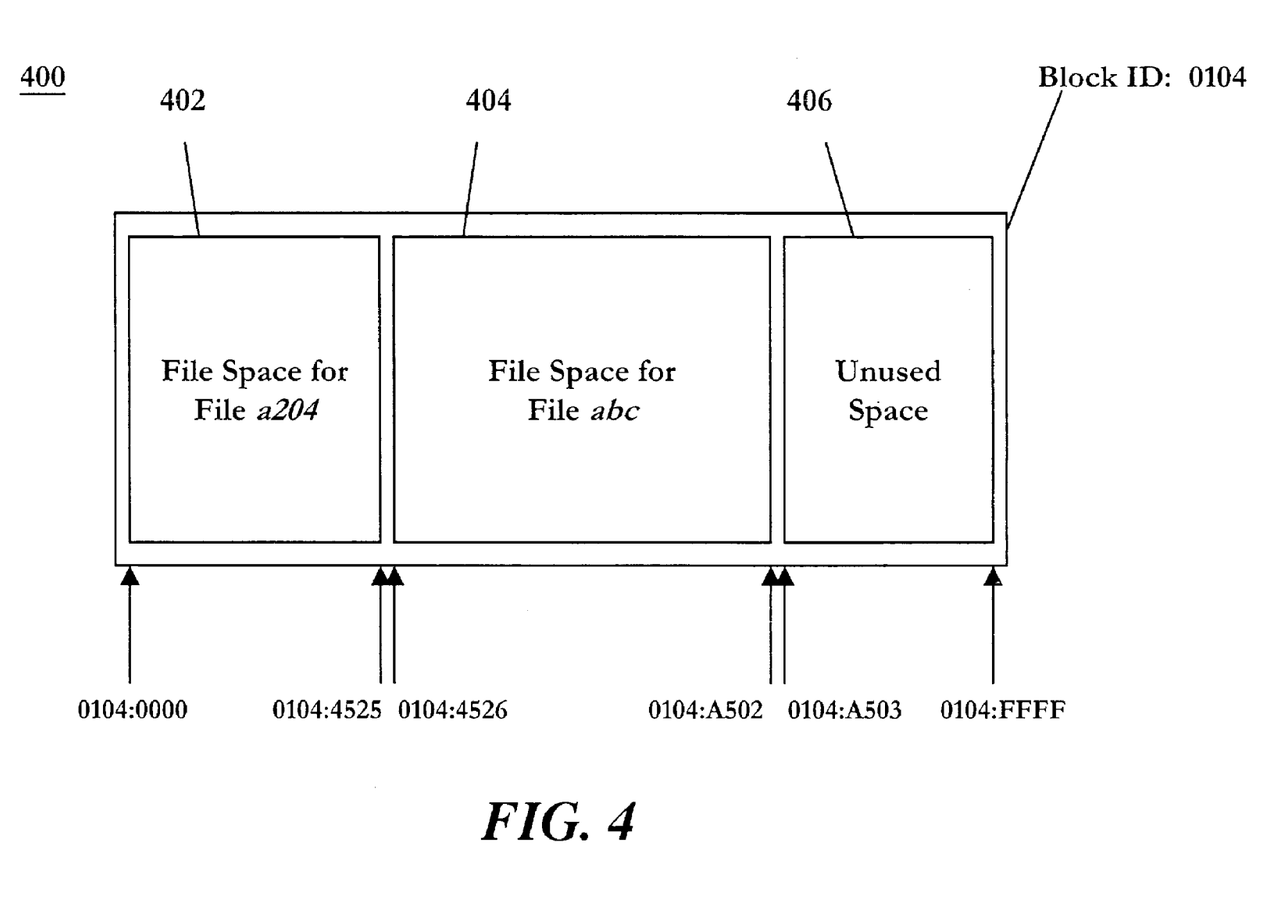
FIG. 4 illustrates the memory content of a memory block used for the storage of data of more than one file.

For example, block ID 0104 appears in two file entries in the file management table 300 of FIG. 3: file abc in entry 312 and file a204 in entry 314. Since each of the 0104 entry in its respective file entry records its own starting and ending memory locations (addresses) in the block, information for both files, though stored next to each other in the block, would not be mixed up when either file is accessed. FIG. 4 illustrates the memory content of the memory block used for the storage of data of more than one file.

The depicted example of the memory block 400 in FIG. 4 assumes a block size of 64 k bytes (hexadecimal address 0000 to FFFF). As is illustrated, the first section 402 of the memory space of roughly 17 k bytes with an address range from 0000 to 4525 is assigned for the storage of a segment of the file a204, and the second section 404, roughly 24 k bytes from 4526 to A502 is for another file abc. The last 23 k bytes from A503 to FFFF, namely section 406, remain unused Thus, the block 400 of FIG. 4, which exemplifies the local storage content in the memory block with ID 0104, is enlisted simultaneously as a block storage entry for file a204 (file entry 314 in FIG. 3) and for file abc (entry 312). Block entry 0104 for the file a204 (entry 314) maintains a pair of start and end address registers with contents 0000 and 4525 respectively, and the other entry 0104 for file abc (312) registers 4526 and A502 respectively.

Read access for data in this block 400 for either file is straight-forward using these start and end addresses in this local block. However, due the block writing characteristics of Flash memory devices, the writing of either file will involve the simultaneous writing of the data of the other since the entire memory content of block 400 needs to be written even if only one single byte is changed for either file.

Figure 5:
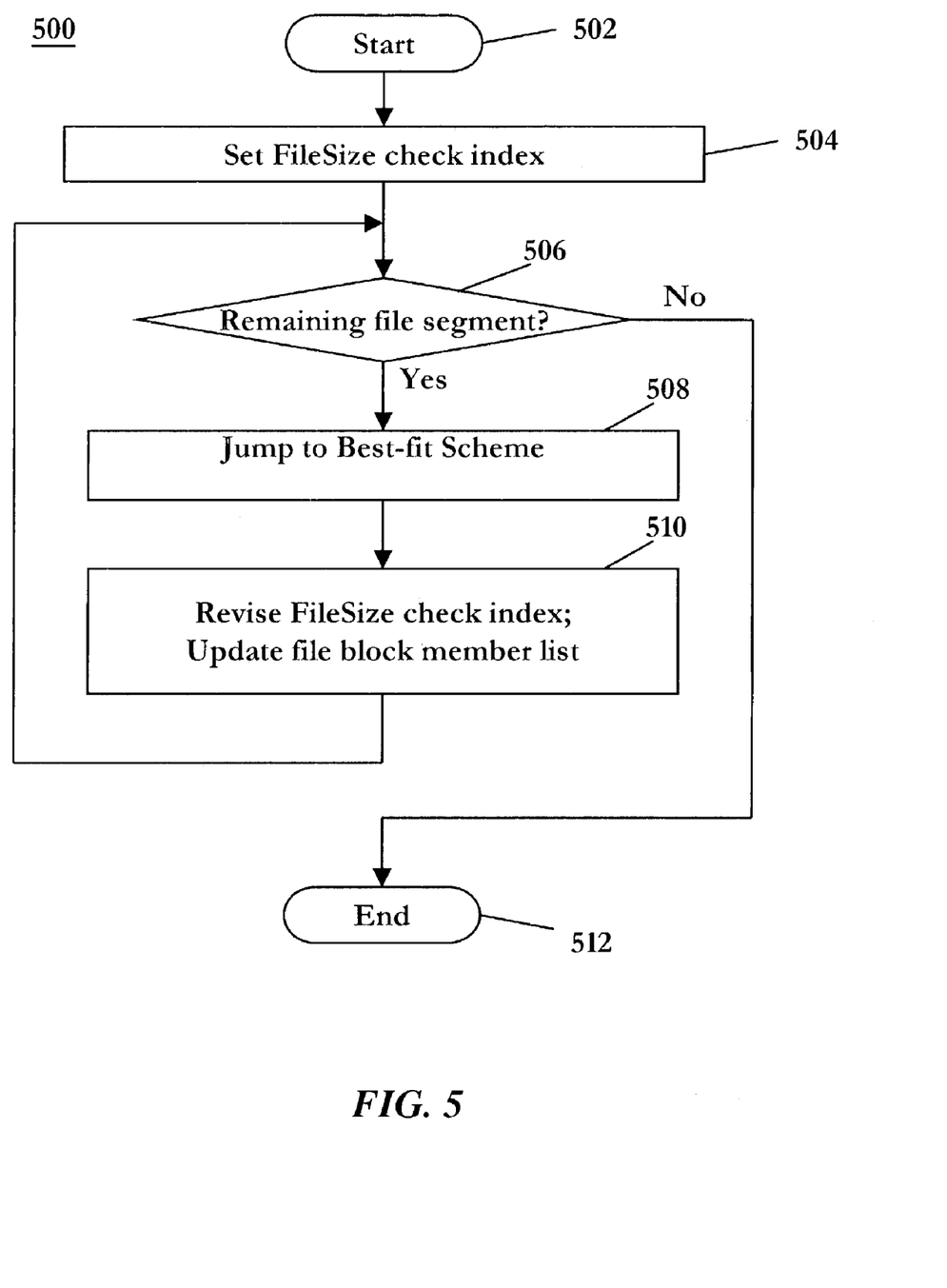
FIG. 5 is a flowchart depicting the basic file block allocation scheme for the optimized access software system in accordance with an embodiment of the present invention.

When an application program hosted by the computer system writes a file into the memory subsystem as managed by the inventive optimized access software system, a file block allocation scheme is invoked to determine and assign memory blocks for the storage of file segments. The processing result of this file allocation scheme is a file entry in the file management table 300 described above. FIG. 5 is a flowchart depicting the basic file block allocation scheme for the optimized access software system in accordance with an embodiment of the present invention.

As the host computer assigns a file for storage in the block-write memory subsystem, the file content is processed to determine the size of the file (in terms of the number of blocks) so that segments of the file can be stored into blocks of the memory subsystem allocated in accordance with the best-fit scheme of the present invention. The file block allocation scheme 500 of FIG. 5 starts at step 502 and, according to the size of the file to be stored, a file size check index is set up at step 504. The scheme 500 then proceeds to step 506 to check to see if the entire file has been best-fitted into available blocks of the host computer memory subsystem. In an embodiment, this is implemented by checking to see if there is still file segment remaining to find storage space in the memory subsystem. A negative result terminates the scheme at step 512.

Note that the negative test result at step 506 may also signify the situation of unfinished file storage in the memory subsystem. For example, if the storage space in the memory subsystem has already been depleted to a level insufficient for the storage of the target file, the file block allocation scheme 500 still needs to conclude. Other program design particulars not in the scope of the present invention can be implemented to take care of this situation. In the following discussions, the program assumes the normal operating condition that total memory storage space is sufficient for the storage of the target file.

Figure 6:
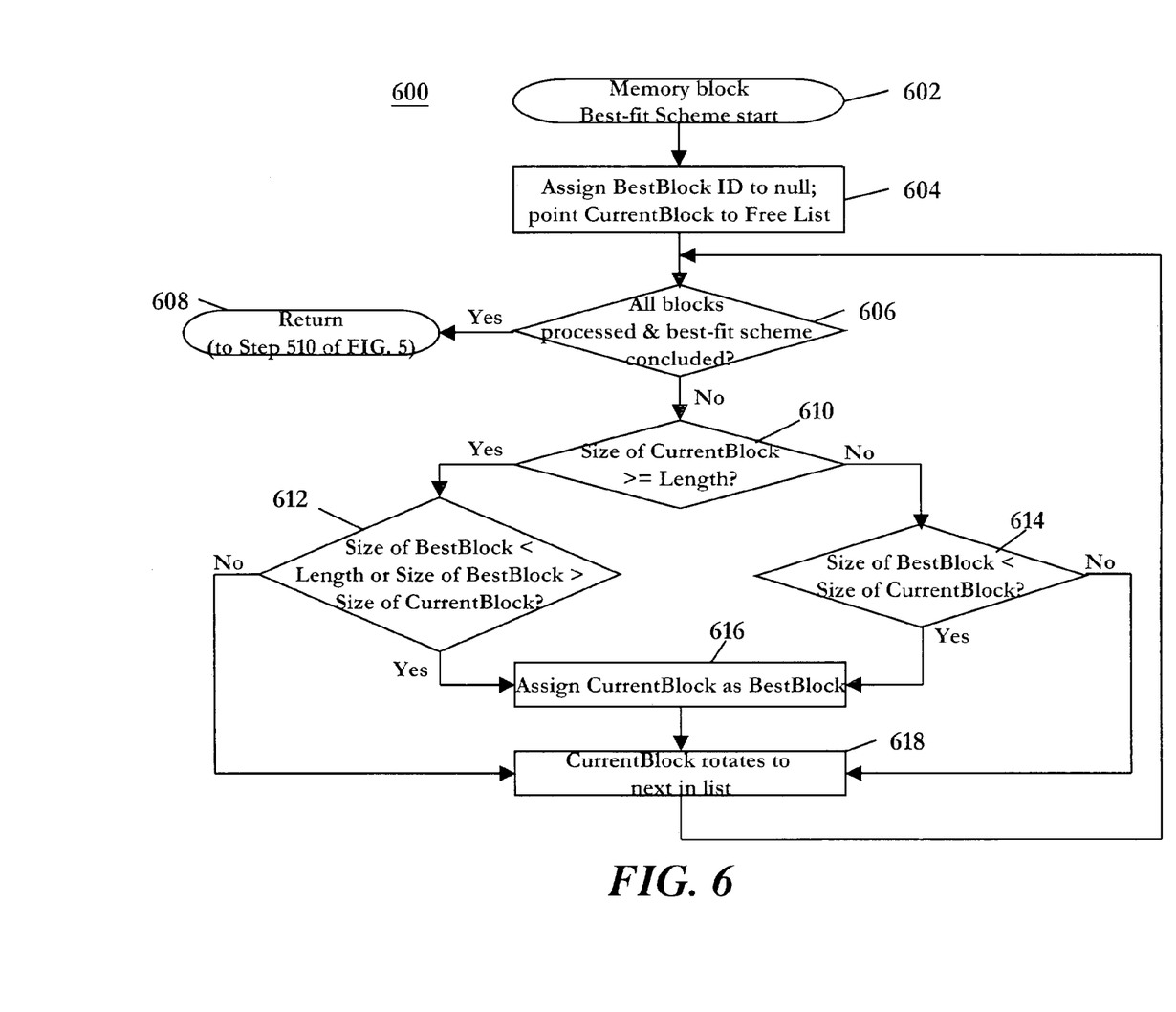
FIG. 6 is a flowchart outlining the best-fit algorithm employed by the basic scheme of FIG. 4.

At the very beginning of the file block allocation scheme 500, however, the test result of step 506 is positive and the scheme proceeds to step 508 accordingly, where the processing is immediately transferred to a best-fit scheme, a program subroutine 600 as outlined in FIG. 6. The best-fit algorithm of FIG. 6 is responsible for the selection of a best-fitted memory block out of the pool of available free blocks in the memory subsystem. Details of this best-fit algorithm will be described separately in the following paragraphs.

Once a block in the available pool is selected and assigned as the best-fit for the file, the subroutine 600 in FIG. 6 concludes and program control is transferred by the subroutine 600 at step 608 back to the basic file block allocation scheme 500. Program execution of scheme 500 then continues at step 510 and the file size check index for the processed file is adjusted in accordance with the processing result of the subroutine 600 of FIG. 6.

The process of file storage is one that stores a specific number of segments of the file into a corresponding number of blocks in the memory subsystem. If the memory subsystem of the host computer is sparsely used, such as in the early stage of the use of the computer, it is highly likely that the process of fitting all file segments of the file sought to be written into the memory subsystem is a straightforward process of successively writing consecutive file segments into comparably consecutive blocks in the memory subsystem. However, as the host computer is used for a prolonged period of time, in which file writing accesses repeatedly scramble the use of memory blocks in the memory subsystem, holes of available memory blocks in the memory subsystem become mixed with segments of relatively short lengths of continuous memory blocks filled with data.

This being the case, it is likely that the result of the processing by the step 510 in the file block allocation scheme 500, as subsequently checked in step 506, represents the fact that the target file still has a remaining file segment to be "squeezed" into the memory subsystem. If this was the case, the branched processing at step 508 to seek service in the best-fit algorithm 600 would be repeated again. The subroutine transfer for the seeking of best fits of segments of memory blocks in the memory subsystem is repeated until all the file segments of the entire file have their assigned block spaces in the memory subsystem. This is when the basic file block allocation scheme 500 may conclude at step 512. In the process, the best-fit algorithm 600 of FIG. 6 ensures that the fitting of the file segments is an optimized one that achieves both maximized and averaged use of memory spaces in the memory subsystem.

FIG. 6 is a flowchart outlining the best-fit algorithm employed by the basic file block allocation scheme 500 of FIG. 5. The best-fit scheme 600 starts at step 602 by setting up the initial parameters for the scheme at step 604. These include setting initial pointers for the best-fit block candidate and aligning the first available memory block in the free block list of the memory subsystem.

Then, the scheme proceeds to elect a best fit for the target file according to the file size information relayed over by the file block allocation scheme 500 of FIG. 5. The process of best-fitting is implemented by making a series of combinatorial checks in the subsequent examination steps 610, 612 and 614.

At the initiation of the combinatorial checking mechanism, examination step 606 simply checks to see if the best-fitting process in this scheme 600 has screened through all the available blocks in the memory subsystem and fruited a best-fit result. If yes, the scheme concludes and program control returns at step 608 to the calling program, scheme 500 of FIG. 5. If not, the scheme proceeds to step 610 to initiate the process of best-fitting among the available memory blocks in the memory subsystem.

The program loop made up of this test step 606, the last step 618 in the loop which increases the test block count, and the combinatorial checking mechanism in between comprises a program flow that checks through every candidate memory block in the free list before the program execution is returned to the calling program of FIG. 5. In the process, the combinatorial checking mechanism elects one best-fit block, based on the memory use situation of all available memory blocks maintained in the free list.

At step 610, the program scheme examines to see if the first entry in the available block list is greater or equal to the size of file segment submitted into scheme 600 seeking available memory block for storage. If yes, the process then advances to step 612 to further check if the currently-assigned best-fit block candidate has a block size smaller than the length of the segment of the target file seeking memory block or greater than the size of the current-checked block. If no, the process proceeds to step 618, where the program counter points to the next available block in the free block list, and the program then loops back to step 606. If the test result of step 612 is positive, the process advances to step 616, where the current-checked block is assigned as the best-fit block candidate. The process then proceeds to step 618 to rotate to the next free block entry in the list, and subsequently loops back to step 606.

Note here that the length parameter used in step 610 of the checking mechanism is a parameter representing the length in, for example, number of bytes of the file segment seeking storage space in the memory blocks. This parameter is relayed over to this scheme 600 by the calling program 500 of FIG. 5. This length parameter is resolved in step 504 of the basic file block allocation scheme 500 at the very first time of program transfer from scheme 500 to 600. Afterwards, the length parameter is the resolved result of step 510, where the file length becomes shorter as segments of the file are successively stored in the memory blocks as a result of subroutine execution in scheme 600.

Thus, if the result of testing in step 610 is negative, which means the current-checked memory block in the free list is smaller than the length of the target file segment, the process proceeds to step 614 for another check. Step 614 checks to see if the size of the current best-fit block candidate is smaller than the size of the current-inspected block. If no, the program jumps to step 618, the best block candidate is not altered, and the program simply rotates to the next available block in the free list. If yes, the program branches to step 616, where the current-checked block is assigned as the best block candidate.

The series of checking steps of 610, 612 and 614 in different combinations ensures that the final best-fit block as elected from among all the candidates available memory blocks in the free list is the most appropriate one. The best-fit memory block from among the free ones has a size that is closest to the size of the target file segment. If there were more than one free memory block in the list that have sizes larger than the target file segment sought to be stored into the memory subsystem, the best-fit algorithm of FIG. 6 ensures that a closest possible fit is elected. On the other hand, if there was no free memory block in the free pool to match the target file segment to be stored, the mechanism of examination steps 610, 612 and 614 also ensures that the one free memory block with the closest size in the available list be designated as the best fit.

In either case, the scheme of FIG. 5 truncates the target file segment for the length stored, and the rest of the file segment is then resubmitted into the best-fit algorithm of FIG. 6 again for the processing of the entire scheme. This is repeated until the entire length of file to be stored finds spaces in the memory subsystem.

Thus, checking steps 610, 612 and 614 together comprise a mechanism to pick out the one free memory block from among the overall free pool with a continuous memory size most fitted. This ensures minimum waste of free memory space in the selected segment of memory blocks. The best-fit file segment allocation scheme as described above with reference to FIGS. 5 and 6 is therefore able to achieve reduced fragmentation of the stored file and further enforces the discipline of first in first out for the use of available memory blocks in the memory subsystem.

In essence, the best-fit algorithm outlined in FIGS. 5 and 6 which constitutes the core scheme for the optimized access software system of the present invention can be summarized as follows. For a file to be stored into the available memory space of the memory subsystem of the host computer requiring block writing, the size of the file is compared with that of all available blocks in the fire list. This is decided at step 610 of the scheme of FIG. 6. Via the left-hand branch of the scheme 600 (at step 612), that is, if blocks with free spaces larger than the target file size were available, the scheme picks 5 one that is smallest from all those qualified so as to prevent the possible waste of memory space in the selected block. On the other hand, via the right-hand branch of the scheme 600 (step 614), if no one single available block is large enough to receive the entire length of the file, the largest one is selected.

Thus, both processing branches (steps 612 and 614 respectively) of the scheme 600 ensures the selection of a free memory block from among the available that has a most-fitted storage space for the target file. If the content of the entire file could not be stored within one program loop, the basic block allocation scheme truncates the segment of the file already found storage space in one program loop (in subroutine 600), and submits the rest of the file in another loop. And, this process repeats until the entire length of the target file has been settled in the memory subsystem.

Figure 7:
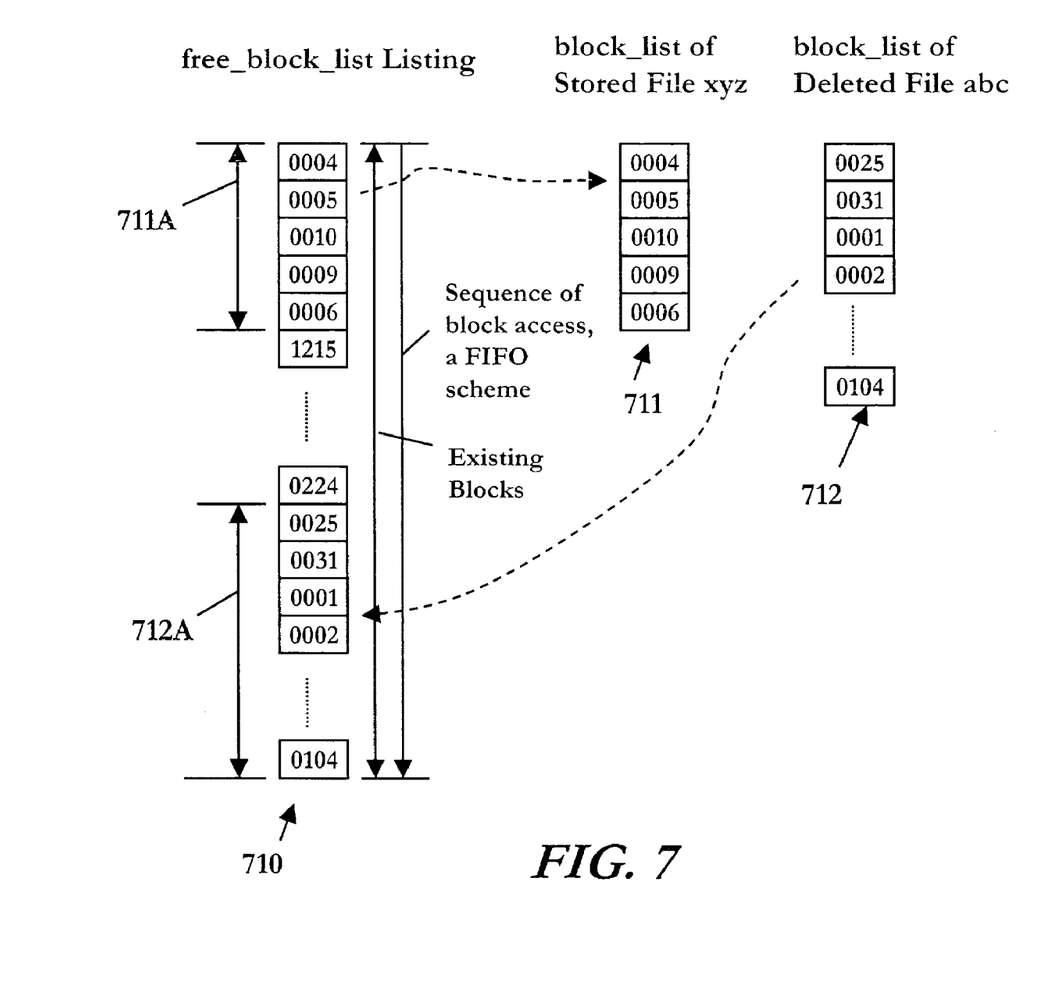
FIG. 7 illustrates the management of the free blocks by the optimized access software system of the present invention.

FIG. 7 illustrates the management of the free memory blocks by the optimized access software system of the present invention. In this depicted example, first a file xyz is written into the memory subsystem, consuming a corresponding segment of free memory blocks from the free list, and then another file abc is deleted from the memory subsystem whose memory spaces are returned back to the pool of free block listing.

For the first file writing operation, the inventive optimized access software system as exemplified and described in FIGS. 5 and 6 subsequently assigns the first five blocks 0004, 0005, 0010, 0009 and 0006, generally identified as a chunk of blocks 711A, from the top of the free block list 710 for the storage of file segments of the file xyz, identified in the drawing as file entry 711. Then, as the file abc is deleted from the file system, all the memory blocks generally identified as block section 712A it has occupied are now released and attached to the end of the free block list 710.

Figure 8:
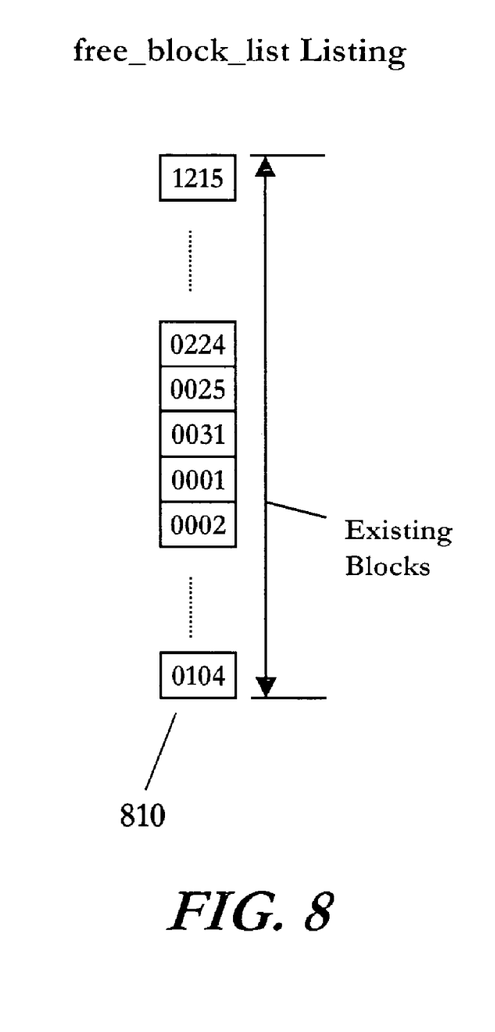
FIG. 8 illustrates the result of the free block management in FIG. 7.

FIG. 8 illustrates the result of the free block management in FIG. 7. The free block list 810 after the write and delete file accesses in FIG. 7 now has a top block with ID 1215, and a last 0104. It is apparent from the above-described block manipulation that block assignments for file storage are always from top of the free list and block releases of file delete are always attached to the end of the free list—a first-in first-out, FIFO, scheme.

Figure 9:
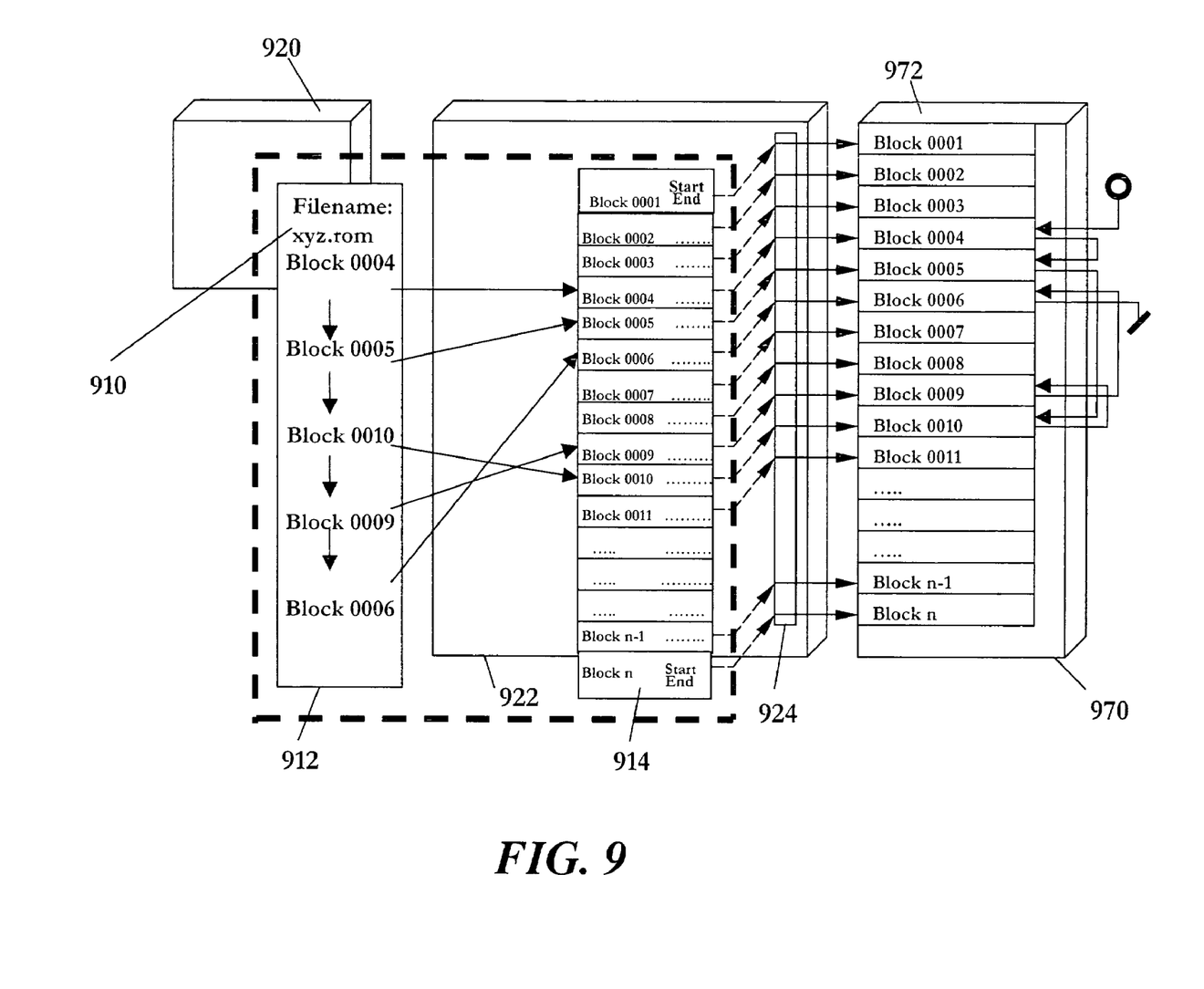
FIG. 9 illustrates the abstraction of the physical storage of information in a Flash memory device in accordance with a preferred embodiment of the present invention.

FIG. 9 illustrates the abstraction of the physical storage of information in a Flash memory device in accordance with a preferred embodiment of the present invention. The illustration depicts the use of a computer system with a CPU 920 and a block-write memory subsystem 970 in a file-writing access. The system of FIG. 9 may be one in which a microprocessor-based dedicated computer system such as a communications switch submits a file for storage in the Flash memory array via the software layers.

A computer user using an application program writes a file xyz, identified as 910, into the memory subsystem 970 of the computer. File structure 912 of file xyz resolved by the inventive optimized access software system at the hardware driver layer of the system, as outlined in the drawing, shows that the file has a size of the equivalence of five memory blocks: Block 0004, 0005, 0010, 0009 and 0006.

The file structure 912 is thus substantially mapped onto a managed list of memory blocks, generally identified as 914 in the drawing, by the inventive software system. In the drawing, the involved memory blocks assigned for the storage of file xyz are shown with the start and end addresses in each of the local blocks. Based on this information, the Flash sub-logic 924 of the memory controller of the system logic 922 of the computer system physically implements the writing of the file content into the physical flash memory 972 of the memory subsystem 970.

Note here that, as mentioned above, the fragmentation of memory blocks in the memory subsystem for a file constitutes no performance problem for the memory access speed as does in a hard disk drive that relies on mechanical head movements for its access of data on the surface of the magnetic disks.

Thus, the present invention has disclosed a system and method for the optimized access of memory devices requiring block writing particularly suitable for dedicated-application computer systems such communications equipment including switches and routers and Internet appliances of various sort. The inventive optimized access software system implements an indirect indexing scheme that is advantageous in freeing up the user from software compilations involving absolute addressing in the hardware memory. Portability of files in the microcomputer/processor systems is thus easily achievable. The inventive system and method also achieves balanced utilization of memory cells in a Flash memory device for prolonged device life. Efficient use of memory locations in a Flash memory device also leaves no un-used small memory chunks for reduced overall system costs.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of information storage for storing a file in a memory device requiring block writing, wherein said memory device has a plurality of free blocks, wherein the file is larger than any single contiguous area of free blocks, said method comprising the steps of:
   comparing the size of a remainder of said file with each of said free blocks available for memory storage for selecting a best-fit block from said free blocks;
   determining a fitted segment corresponding to said best-fit block in the remainder of said file;
   storing said fitted segment of the remainder of said file into said best-fit block, and thereafter excluding said fitted segment from the remainder of said file, and excluding said best-fit block from said free blocks available for memory storage; and
   repeating said comparing step, and said storing step if the remainder of said file remains after said storing until the entirety of said file has been stored in said memory device.

2. The method of information storage of claim 1, wherein said selecting of said best-fit block comprises the steps of:
   setting an initial value for the size of said best-fit block;
   selecting a selected block from said free blocks available for memory storage based on the order of first-in first-out;
   comparing the size of said selected block, the size of the current best-fit block and the size of the remainder of said file and replacing said current best-fit block with said selected block as the new best-fit block when the size of said selected block is greater than or equal to the size of the remainder of said file and the size of said current best-fit block is smaller than the size of the remainder of said file or is greater than the size of said selected block; and
   repeating the previous two steps until each of said free blocks available for memory storage has been selected and compared.

3. The method of information storage of claim 1, wherein said selecting of said best-fit block comprises the steps of:
   setting an initial value for the size of said best-fit block;
   selecting one block from said free blocks available for memory storage based on the order of first-in first-out;
   comparing the size of said selected block, the size of the current best-fit block and the size of the remainder of said file and replacing said current best-fit block with said selected block as the new best-fit block when the size of said selected block is smaller than the size of the remainder of said file and the size of said current best-fit block is smaller than the size of said selected block; and
   repeating the previous two steps until each of said free blocks available for memory storage has been selected and compared.

4. The method of information storage of claim 1, wherein said memory device is a Flash memory.

5. An information storage system comprising:
   a memory device requiring block writing, wherein said memory device has a plurality of free blocks; and
   a file system built on top of the software driver module of said memory device and providing a memory block assignment algorithm for implementing an efficient information storage usage for storing a file in said memory device, wherein the file is larger than any single contiguous area of free blocks, said memory block assignment algorithm comprising the steps of:
   comparing the size of a remainder of said file with each of said free blocks available for memory storage for selecting a best-fit block from said free blocks;
   determining a fitted segment corresponding to said best-fit block in the remainder of said file;
   storing said fitted segment of the remainder of said file into said best-fit block, and thereafter excluding said fitted segment from the remainder of said file, and excluding said best-fit block from said free blocks; and
   repeating said comparing step and said storing step if the remainder of said file remains after said storing until the entirety of said file has been stored in said memory device.

6. The information storage system of claim 5, wherein said file system comprises a storage layer and a file layer, and said storage layer further comprises a plurality of data blocks each corresponding to a memory block of said memory device, said storage layer maintaining a record of the starting and ending addresses and the size of each of said corresponding memory blocks, and said file layer maintaining a list of the selected data blocks for each data segment of said file.

7. The information storage system of claim 5, wherein said selecting of said best-fit block comprises the steps of:
   setting an initial value for the size of said best-fit block;
   selecting one block from said free blocks available for memory storage based on the order of first-in first-out;
   comparing the size of said selected block, the size of the current best-fit block and the size of the remainder of said file and replacing said current best-fit block with said selected block as the new best-fit block when the size of said selected block is greater than or equal to the size of the remainder of said file and the size of said current best-fit block is smaller than the size of the remainder of said file or is greater than the size of said selected block; and
   repeating the previous two steps until each of said free blocks available for memory storage has been selected and compared.

8. The information storage system of claim 5, wherein said selecting of said best-fit block comprises the steps of:
   setting an initial value for the size of said best-fit block;
   selecting one block from said free blocks available for memory storage based on the order of first-in first-out;
   comparing the size of said selected block, the size of the current best-fit block and the size of the remainder of said file and replacing said current best-fit block with said selected block as the new best-fit block when the size of said selected block is smaller than the size of the remainder of said file and the size of said current best-fit block is smaller than the size of said selected block; and
   repeating the previous two steps until each of said free blocks available for memory storage has been selected and compared.

9. The information storage system of claim 5, wherein said memory device requiring block writing is a Flash memory.

* * * * *